United States Patent [19]

Inuzuka et al.

[11] Patent Number: 5,683,617
[45] Date of Patent: Nov. 4, 1997

[54] MAGNETIC MATERIAL AND MANUFACTURING METHOD THEREOF

[75] Inventors: Tsutomu Inuzuka, Kadoma; Shinji Harada, Katano; Hiroshi Fujii, Takatsuki; Michio Ohba, Kadoma, all of Japan

[73] Assignee: Matsushita Electric Industrial Co., Ltd., Osaka, Japan

[21] Appl. No.: 594,394

[22] Filed: Jan. 31, 1996

Related U.S. Application Data

[63] Continuation of Ser. No. 256,082, Jun. 29, 1994, Pat. No. 5,518,641.

[30] Foreign Application Priority Data

| Nov. 25, 1992 | [JP] | Japan | 4-314817 |
| Jul. 16, 1993 | [JP] | Japan | 5-176453 |
| Oct. 19, 1993 | [JP] | Japan | 5-260771 |

[51] Int. Cl.$^6$ .................................. C04B 35/30
[52] U.S. Cl. ..................... 252/62.56; 252/62.62
[58] Field of Search ............... 252/62.56, 62.62; 423/594

[56] References Cited

U.S. PATENT DOCUMENTS

| 2,700,023 | 1/1955 | Albers-Schönberg | 252/62.56 |
| 4,490,268 | 12/1984 | Tchernev | 252/62.56 |

FOREIGN PATENT DOCUMENTS

| 0490245A1 | 6/1992 | European Pat. Off. |
| 39-20677 | 9/1964 | Japan . |
| 58-135177 | 8/1983 | Japan . |
| 58-135606 | 8/1983 | Japan . |
| 64-72924 | 3/1989 | Japan | 252/62.56 |
| 1-264959 | 10/1989 | Japan . |
| 4142003 | 5/1992 | Japan . |

OTHER PUBLICATIONS

Database WPI Week 9425, Derwent Publications Ltd., London, GB; AN 94–208000 & SU–A–1 809 931 (USSR Structural Makrokinetics Inst.) 15 Apr. 1993.

Database WPI Week 9435, Derwent Publications Ltd., GB; AN 94–284689 & SU–C–2 009 561 (USSR Structural Makrokinetics Inst.) 15 Mar. 1994.

Database WPI Week 8031, Derwent Publications Ltd., London, GB; AN 80–54382C & JP–A–55 080 727 (Mitsubishi) Jun. 19, 1980.

Database WPI Week 9206, Derwent Publications Ltd., London, GB; AN 92–046159 & JP–A–3 291 901 (TDK) 24 Dec. 1991.

*Primary Examiner*—Melissa Bonner

[57] ABSTRACT

The invention relates to a magnetic material and a method of manufacturing the same. An objective of the invention resides in providing a magnetic material whose dimensional change rate after sintering is low and whose magnetic property is not deteriorated. In order to achieve the objective, a magnetic material according to the invention comprises a great number of ferrite grains (1) which are formed by sintering ferrite raw powder, and shrinkage preventing grains (2) which are interposed among these plural ferrite grains (1) and which are sintered with the ferrite grains (1) in contact with the outer peripheries thereof and are also oxidized with oxygen so as to change into ferrite when they are sintered.

10 Claims, 2 Drawing Sheets

MAGNETIC MATERIAL AND MANUFACTURING METHOD THEREOF

This is a continuation of application Ser. No. 08/256,082 filed Jun. 29, 1994, now U.S. Pat. No. 5,618,641.

TECHNICAL FIELD

The present invention relates to a magnetic material used for various kinds of electronic parts, and a method of manufacturing the same.

BACKGROUND ART

A conventional magnetic material has been manufactured in the following manner.

First, ferrite raw powder is previously sintered, thereafter, the sintered mass is crushed. Particles obtained by the crushing operation are thereafter compressed in metallic dies. The compact removed from the metallic dies is sintered. Thus, the magnetic material is obtained. However, it is a well-known fact that the magnetic material manufactured in the above-described manner inevitably shrinks during the sintering process, and consequently, the magnetic material is designed considering this shrinkage so that it will have a slightly larger size than a desired size when it is sintered. Therefore, after the sintering process, the magnetic material must be cut to have the desired size and shape. However, since the magnetic material after sintered is extremely hard, a cutting blade wears considerably, and it must be replaced with a new one frequently. As a result, the manufacturing cost increase.

Consequently, there was suggested a magnetic material whose shrinkage during sintering was substantially prevented so that the above-mentioned cutting operation would not be required (cf. JP-A-1-264959). This magnetic material is manufactured by mixing magnetic powder with filling powder which is one kind selected from silicon, titanium and aluminum, compressing this mixture by metallic dies, and thereafter sintering the compact, which has been removed from the metallic dies, in an oxygen atmosphere or in a nitrogen atmosphere. In the case of this conventional magnetic material, oxidization expansion or nitrogenization expansion of the above-mentioned filling powder can decrease shrinkage of the magnetic material during sintering to an extremely small degree. However, silicon, titanium, aluminum or the like which is a non-magnetic material is mixed in the magnetic powder, and consequently, there arises a problem that the magnetic property as the magnetic material is deteriorated.

Thus, an objective of the invention resides in providing a magnetic material whose dimensional change due to sintering is small and whose magnetic property is not deteriorated.

DISCLOSURE OF THE INVENTION

In order to achieve the objective, a magnetic material of the invention comprises a great number of ferrite grains which are formed by sintering ferrite raw powder, and shrinkage preventing grains which are interposed among these plural ferrite grains and which are sintered with the ferrite grains in contact with the outer peripheries thereof and are also oxidized with oxygen so as to change into ferrite when the grains are sintered. Typical shrinkage preventing grains are formed of $Fe_2O_3$, Ni and ZnO which have changed to ferrite. Moreover, typical shrinkage preventing grains are made from filling powder of at least one of Fe, FeO, Ni, Zn and Cu, and a diameter of such filling powder is smaller than about 10 µm.

With the above-described structure, a rate of dimensional change of the magnetic material due to sintering is low, and deterioration in the magnetic property does not occur. The reason is that the shrinkage preventing grains are interposed among the ferrite grains and sintered with the ferrite grains in contact with their outer peripheries, thereby preventing shrinkage which is caused by ferrite grains approaching to one another to be bound, as in the case of the conventional magnetic material. Further, the shrinkage preventing grains are oxidized with oxygen and change into ferrite when they are sintered with the ferrite grains, so that a non-magnetic material observed in the conventional magnetic material will not be mixed, and that the magnetic property will not be deteriorated.

BEST MODE FOR CARRYING OUT THE INVENTION

EXAMPLE 1

Figure 1:
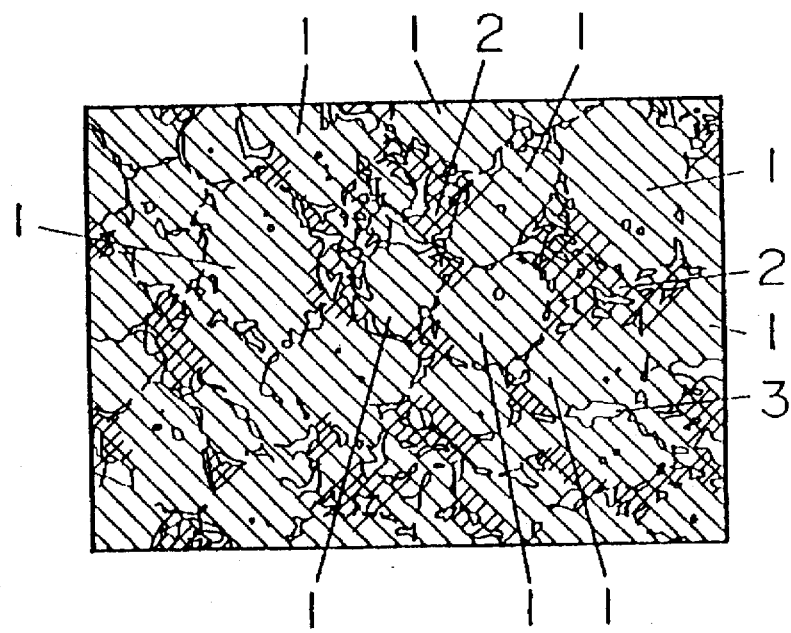
FIG. 1 is an enlarged view showing an internal structure of a magnetic material according to one embodiment of the present invention.
Figure 2:
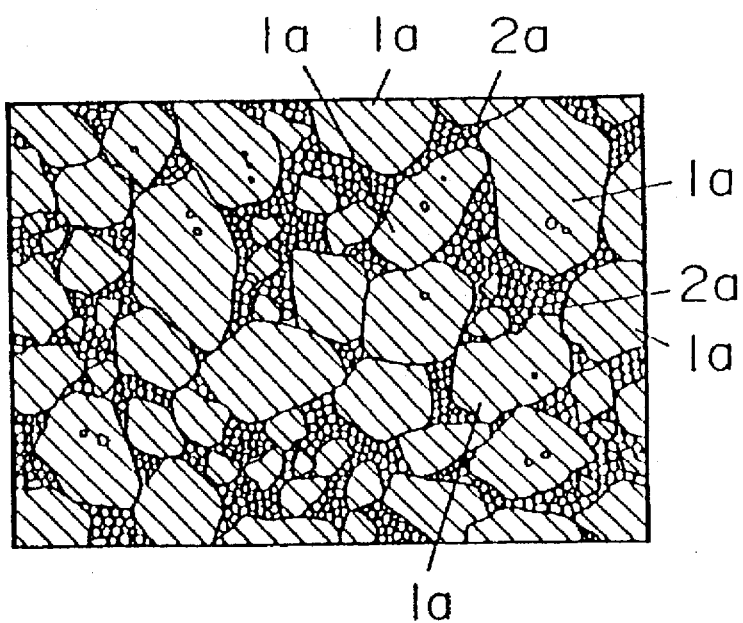
FIG. 2 is an enlarged view showing one condition of the magnetic material in a manufacturing process.

A first embodiment of the present invention will be hereinafter described with reference to the attached drawings. FIG. 1 is an enlarged view showing an internal structure of a magnetic material in the embodiment of the invention. The magnetic material has a cylindrical shape or a plate-like shape and comprises a great number of ferrite grains 1 and contraction preventing grains 2 which are located among the great number of ferrite grains 1. The ferrite grains 1 are manufactured by mixing and sintering ferrite raw powder consisting of $Fe_2O_3$, NiO, ZnO and CuO, these having a mixing mole ratio of 47.2:15.5:32.1:5.2, crushing the sintered mass, and sintering crushed ferrite particles 1a. Further, the ferrite grains 1 thus obtained are mixed with metal iron powder 2a having a diameter of 5 µm or less, as shown in FIG. 2, which amounts to 20 parts by weight of the ferrite particles 1a, and the mixture is sintered. Thus, the shrinkage preventing grains 2 are formed among the ferrite grains 1, as shown an FIG. 1. Sintering, also known as calcining, of the compact obtained in the fourth step occurred at a lower temperature than in the first step.

A manufacturing method of the magnetic material comprises a first step of sintering, at 1320° C. for six hours, ferrite raw powder consisting of $Fe_2O_3$, NiO, ZnO and CuO which have a mixing mole ratio of 47.2:15.5:32.1:5.2, a second step of forming ferrite particles 1a by crushing the sintered mass into particles having a diameter of 40 µm or less, a third step of forming shrinkage preventing grains 2 by mixing metal iron powder 2a having a diameter of 5 µm or less with the ferrite particles 1a, as shown in FIG. 2, which metal iron powder amounts to 20 parts by weight of the ferrite particles 1a, a fourth step of forming pellets by adding 7 wt % epoxy resin to a mixture of the ferrite particles 1a and the metal iron powder 2a, a fifth step of compressing the formed pellets into an article of a cylindrical shape having an inner diameter of 7 mm, an outer diameter of 12 mm and a thickness of 3 mm under a pressure of 3 ton/cm$^2$, and a sixth step of sintering the compact of the cylinder shape in an electric furnace at 1200° C.

In this example, it is a notable characteristic that, as shown in FIG. 2, the metal iron powder 2a for forming the shrinkage preventing grains 2 is located among the great number of ferrite grains 1 in the third step, and this mixture is sintered.

That is to say, by sintering in the sixth step, the metal iron powder 2a thus located is sintered with the ferrite grains 1 in contact with their outer peripheries, and also oxidized with oxygen, so that the metal iron powder 2a formed into the shrinkage preventing grains 2 by sintering will prevent the ferrite grains 1 from approaching to one another to be sintered, as shown in FIG. 1. As a result, the dimensional change rate is extremely low.

In the sixth step, although the ferrite grains 1 are partially sintered with one another, the metal iron powder 2a is located in large gaps among the ferrite grains 1 without fail, as shown in FIG. 2, so that the ferrite grains 1 will be generally sintered with the shrinkage preventing grains 2, to thereby prevent shrinkage.

Moreover, at the time of sintering in the sixth step, the metal iron powder 2a combines with oxygen in the external atmosphere and is oxidized to increase in diameter. When the metal iron powder 2a among the ferrite grains 1 is oxidized and expansion, shrinkage among the ferrite grains 1 is likewise prevented.

When the metal iron powder 2a is sintered with the ferrite grains 1 on the outer peripheries thereof, elements are partially diffused and supplied from the ferrite grains 1, and the above-described oxidization simultaneously takes place, so that the metal iron powder 2a itself changes into ferrite. By the way, reference numeral 3 in FIG. 1 denotes a gap formed after sintering.

Figure 3:
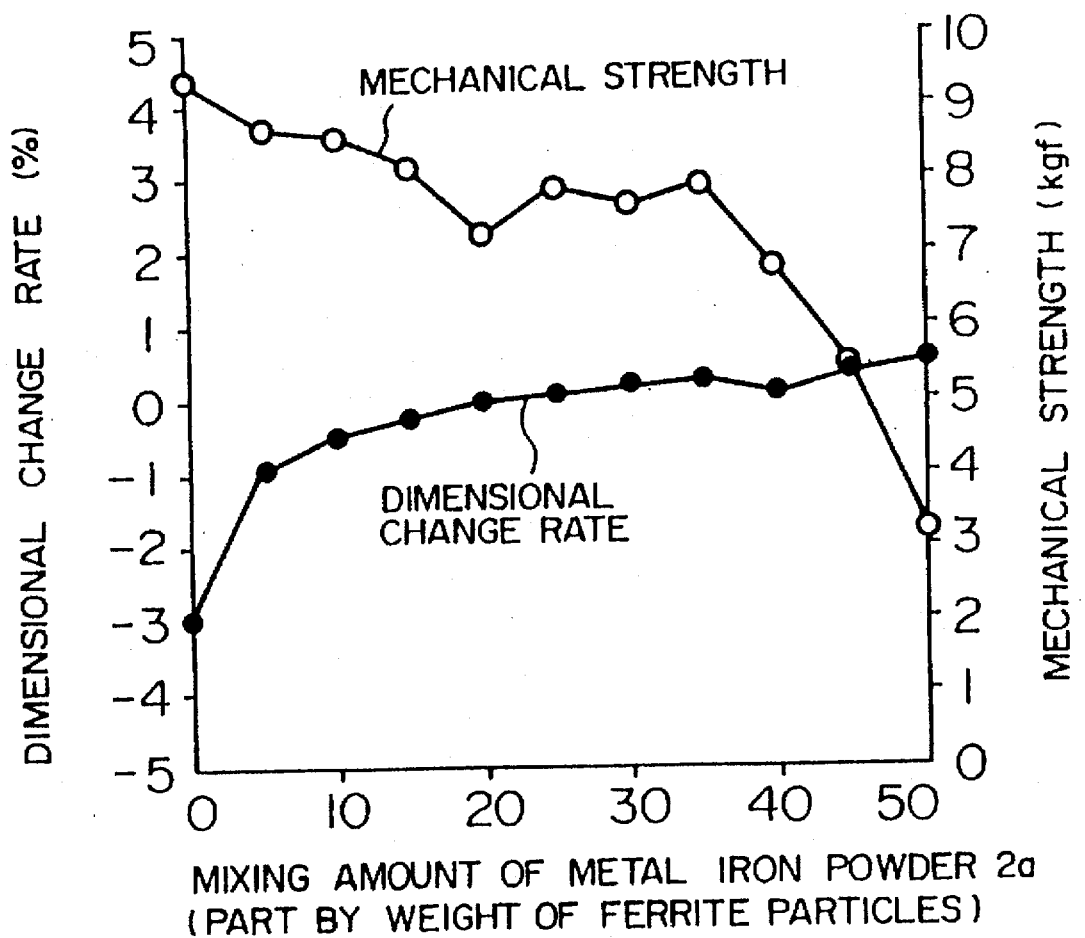
FIG. 3 is a characteristic graph showing a dimensional change rate.

FIG. 3 illustrates the relationship between a mixing amount of iron metal powder 2a and a dimensional change rate and a mechanical strength of a magnetic material. As samples, magnetic materials obtained by mixing 0 to 50 parts of metal powder 2a by weight of ferrite particles 1a of metal iron powder 2a with ferrite particles 1a are employed. As shown in FIG. 3, when the mixing amount of the metal iron powder 2a is five parts by weight of ferrite particles or less, the mechanical strength is sufficient, but the effect as the shrinkage preventing grains 2 is so small that the dimensional change rate during sintering is increased. When the mixing amount of metal powder is 40 parts by weight of ferrite particles or more, a sufficient mechanical strength can not be obtained although the dimensional change rate is low. Therefore, the mixing amount of the metal iron powder 2a should preferably be more than five parts by weight of ferrite particles and less than 40 parts by weight of ferrite particles.

Properties of magnetic materials obtained by adding 2 to 30 parts of metals or metallic compounds other than the metal iron powder 2a by weight of ferrite particles, as the shrinkage preventing grains 2, and properties of magnetic materials obtained by adding the metal iron powder 2a are shown in Table 1 for comparison.

TABLE I

| SPECIMEN NO. | FILLING POWDER | DIAMETER (μm) | ADDITIVE AMOUNT (WEIGHT PART) | DIMENSIONAL CHANGE RATE (%) | INITIAL MAGNETIC PERMEABILITY | MECHANICAL STRENGTH (Kgf) |
|---|---|---|---|---|---|---|
| 1 | METAL IRON | <5 | 5 | −0.9 | 270 | 8.1 |
| 2 | METAL IRON | <5 | 10 | −0.4 | 240 | 7.5 |
| 3 | METAL IRON | <5 | 20 | −0.0 | 245 | 7.3 |
| 4 | METAL IRON | <5 | 30 | 0.2 | 245 | 7.3 |
| 5 | METAL NICKEL | <3 | 5 | −0.9 | 130 | 8.8 |
| 6 | METAL NICKEL | <3 | 10 | −0.7 | 120 | 8.2 |
| 7 | METAL NICKEL | <3 | 20 | 0.0 | 80 | 7.8 |
| 8 | METAL NICKEL | <3 | 30 | 0.2 | 60 | 7.5 |
| 9 | METAL ZINC | <7 | 7 | −0.9 | 180 | 8.9 |
| 10 | METAL ZINC | <7 | 10 | −0.5 | 110 | 9.0 |
| 11 | METAL ZINC | <7 | 20 | 0.0 | 90 | 9.1 |
| 12 | METAL ZINC | <7 | 30 | 0.6 | 80 | 9.0 |
| 13 | FeO | <10 | 5 | −0.8 | 220 | 6.1 |
| 14 | FeO | <10 | 10 | −0.4 | 150 | 5.8 |
| 15 | FeO | <10 | 20 | 0.0 | 130 | 6.0 |
| 16 | FeO | <10 | 30 | 0.0 | 125 | 6.3 |

Specimen No. 1 to 16 are the magnetic materials according to this embodiment obtained by adding various kinds of filling powder (metal iron powder (Fe), metal nickel powder (Ni), metal zinc powder (Zn), iron oxide powder (FeO)).

As clearly understood from Table 1, the optimum mixing amounts for decreasing the dimensional change rates varied in accordance with the kinds of filling powder. However, as the mixing amount of the filling powder increased, the dimensional change rate decreased, and magnetic materials which had the same dimensions as the molded articles could be obtained. Further, in all of specimens No. 1 to 16, sufficient magnetic properties and mechanical strengths could be obtained.

Properties of magnetic materials obtained by mixing various kinds of metals at desired percentages (wt %) as filling powder, and adding 15 to 25 parts of the mixed powder by weight of ferrite particles to ferrite particles are shown in Table 2 for comparison.

TABLE 2

| SPECIMEN NO. | METAL POWDER MIXING PERCENTAGE (wt %) | | | MIXING RATE (WEIGHT PART) | DIMENSIONAL CHANGE RATE (%) | INITIAL MAGNETIC PERMEABILITY | MECHANICAL STRENGTH (kgf) |
|---|---|---|---|---|---|---|---|
| | IRON | NICKEL | ZINC | | | | |
| 17 | 40 | 60 | 0 | 25 | 0.0 | 190 | 9.6 |
| 18 | 40 | 40 | 20 | 20 | 0.2 | 225 | 8.3 |
| 19 | 40 | 20 | 40 | 20 | 0.3 | 210 | 8.6 |

TABLE 2-continued

| SPECIMEN NO. | METAL POWDER MIXING PERCENTAGE (wt %) | | | MIXING RATE (WEIGHT PART) | DIMENSIONAL CHANGE RATE (%) | INITIAL MAGNETIC PERMEABILITY | MECHANICAL STRENGTH (kgf) |
|---|---|---|---|---|---|---|---|
| | IRON | NICKEL | ZINC | | | | |
| 20 | 40 | 0 | 60 | 20 | 0.2 | 200 | 11.5 |
| 21 | 20 | 80 | 0 | 25 | 0.0 | 105 | 10.2 |
| 22 | 20 | 60 | 20 | 20 | 0.5 | 125 | 7.8 |
| 23 | 20 | 40 | 40 | 20 | 0.5 | 125 | 7.2 |
| 24 | 20 | 20 | 60 | 20 | 0.4 | 140 | 7.1 |
| 25 | 20 | 0 | 80 | 20 | 0.2 | 150 | 10.6 |
| 26 | 0 | 80 | 20 | 20 | 0.7 | 90 | 6.3 |
| 27 | 0 | 60 | 40 | 15 | 0.8 | 70 | 6.4 |
| 28 | 0 | 40 | 60 | 15 | 0.8 | 75 | 6.4 |
| 29 | 0 | 20 | 80 | 20 | 0.7 | 85 | 7.4 |

Specimens No. 17 to 29 are the magnetic materials according to this embodiment obtained by adding various kinds of filling powder (mixed powder of metal iron powder, metal nickel powder and metal zinc powder).

As clearly understood from Table 2, although the filling powder is mixed powder, magnetic materials whose dimensional change rates are low and which have sufficient magnetic properties and mechanical strengths could be obtained.

EXAMPLE 2

A second embodiment of the present invention will be now described. Structures of magnetic materials and their manufacturing methods which are used in Example 2 are substantially the same as those of Example 1 so that explanations thereof will be omitted. Properties of the magnetic materials in which filling powder for forming contraction preventing grains 2 is varied will be described below.

Properties of magnetic materials obtained by adding 20 to 25 parts of filling powder by weight of ferrite particles to ferrite particles for forming ferrite grains 1 are shown in Table 3 for comparison.

kinds of filling powder (mixed powder of metal iron powder (Fe), metal nickel powder (Ni) and metal zinc powder (Zn)) at different mixing percentages.

As clearly understood from Table 3, magnetic materials which had the same dimensions as the compacts could be obtained, and initial magnetic permeabilities were larger than those of the specimens of Example 1.

Properties of magnetic materials obtained by mixing various kinds of metals or various kinds of metallic oxides as filling powder at percentages substantially equal to the structural percentage of powder metallic elements which constitute the sample 35, and adding 25 weight parts of the mixed powder to ferrite particles for forming ferrite grains 1 are shown in Table 4 for comparison.

TABLE 3

| SPECIMEN NO. | METAL POWDER MIXING PERCENTAGE (wt %) | | | MIXING RATE (WEIGHT PART) | DIMENSIONAL CHANGE RATE (%) | INITIAL MAGNETIC PERMEABILITY | MECHANICAL STRENGTH (kgf) |
|---|---|---|---|---|---|---|---|
| | IRON | NICKEL | ZINC | | | | |
| 30 | 80 | 20 | 0 | 25 | 0.0 | 340 | 10.8 |
| 31 | 80 | 0 | 20 | 25 | 0.0 | 380 | 11.4 |
| 32 | 60 | 40 | 0 | 25 | 0.0 | 300 | 10.5 |
| 33 | 60 | 20 | 20 | 25 | 0.1 | 360 | 11.0 |
| 34 | 60 | 0 | 40 | 20 | 0.1 | 310 | 10.2 |
| 35 | 63 | 13 | 24 | 20 | 0.1 | 460 | 10.3 |

Specimens No. 30 to 35 are the magnetic materials according to this embodiment obtained by adding various

TABLE 4

| SPECIMEN NO. | METAL OR METALLIC OXIDE | DIMENSIONAL CHANGE RATE (%) | INITIAL MAGNETIC PERMEABILITY | MECHANICAL STRENGTH (kgf) |
|---|---|---|---|---|
| 36 | METAL IRON, NICKEL OXIDE, ZINC OXIDE | 0.0 | 480 | 10.8 |
| 37 | IRON OXIDE, | 0.0 | 470 | 11.3 |

TABLE 4-continued

| SPECIMEN NO. | METAL OR METALLIC OXIDE | DIMEN- SIONAL CHANGE RATE (%) | INITIAL MAGNETIC PERME- ABILITY | MECHANICAL STRENGTH (kgf) |
| --- | --- | --- | --- | --- |
| 38 | METAL NICKEL, ZINC OXIDE IRON OXIDE, NICKEL OXIDE, METAL ZINC | 0.0 | 470 | 10.4 |

Specimens No. 36 to 38 are the magnetic materials according to this embodiment obtained by adding various kinds of filling powder (mixed powder of metal iron powder (diameter: 5 μm), metal nickel powder (diameter: 3 μm), metal zinc powder (diameter: 7 μm), nickel oxide powder (diameter: 1 μm), zinc oxide powder (diameter: 1 μm) and iron oxide powder (diameter: 1 μm)) at different mixing percentages. Among these specimens, the specimen 36 contains metal iron powder, nickel oxide powder and zinc oxide powder at a weight ratio of 57.6:15.0:27.4. The specimen 37 contains metal nickel powder, iron oxide powder and zinc oxide powder at a weight ratio of 9.7:67.8:22.5. The specimen 38 contains metal zinc powder, nickel oxide powder and iron oxide powder at a weight ratio of 18.5:69.0:12.5.

In the specimens 36 to 38, as clearly understood from Table 4, magnetic materials which had the same dimensions as the compact could be obtained, and they had sufficient magnetic properties and mechanical strengths.

It should be noted that in the specimens 30 to 38, only the X-ray diffraction peaks which indicated spinel crystal structures were observed, and X-ray diffraction peaks which indicated crystal structures other than the spinel crystal structures observed in the samples of Example 1 were not observed.

This results implies that a sintered product only comprises a ferrite sintered material having a spinel crystal structure so that a sintered material whose initial magnetic permeability is more excellent can be obtained.

EXAMPLE 3

A third embodiment of the present invention will be now described. Structures of a magnetic material and its manufacturing method which are used in Example 3 are substantially the same as those of Example 1 so that explanations thereof will be omitted. Properties of the magnetic material in which filling powder is varied will be described below.

Properties of a magnetic material obtained by mixing metal iron powder (diameter: 5 μm), nickel oxide powder (diameter: 1 μm), zinc oxide powder [diameter: 1 μm) and copper oxide powder (diameter: 1 μm)) as filling powder at a weight ratio of 55.8:12.2:27.6:4.4 so as to have substantially the same composition as ferrite grains 1, and adding 25 parts of mixed powder by weight of ferrite particles of the mixed powder to ferrite particles for forming the ferrite grains 1 are shown in Table 5 for comparison.

TABLE 5

| Specimen No. | DIMENSIONAL CHANGE RATE (%) | INITIAL MAGNETIC PERMEABILITY | MECHANICAL STRENGTH (Kgf) |
| --- | --- | --- | --- |
| 39 | 0.0 | 650 | 12.8 |

As clearly understood from Table 5, the specimen had a uniform structure, and consequently, a sintered magnetic material having a larger initial magnetic permeability than that of Example 2 was obtained. Further, even if the oxides which constitute the above-mentioned filling powder are metal powder, a similar effect can be obtained.

EXAMPLE 4

A fourth embodiment of the present invention will be now described. Magnetic materials used in Example 4 are obtained by mixing 50 parts of filling powder containing at least Zn-system ferrite by weight of ferrite particles with ferrite particles for forming ferrite grains 1 which are formed of ferrite raw powder having a mixing mole ratio of 47.8:15.2:32.0:5.0. Structures of the magnetic materials and their manufacturing methods are substantially the same as those of Example 1 so that explanations thereof will be omitted. Properties of the magnetic materials will be described below.

Properties of the magnetic materials according to this embodiment are shown in Table 6 for comparison.

TABLE 6

| SPECIMEN NO. | FILTING POWDER (wt %) | | | | | | | DIMEN- SIONAL CHANGE RATE (%) | DEFORMA- TION AMOUNT (μm) | INITIAL MAGNETIC PERME- ABILITY | MECHA- NICAL STRENGTH (kgf) |
| --- | --- | --- | --- | --- | --- | --- | --- | --- | --- | --- | --- |
| | Zn-SYSTEM FERRITE | | METAL POWDER | | METAL COMPOUND | | | | | | |
| | ZnFe$_2$O$_4$ | Ni0.1Zn0.9Fe$_2$O$_4$ | Fe | Ni | NiO | ZnO | CuO | | | | |
| 40 | 70.0 | 0.0 | 16.2 | 0.0 | 10.3 | 0.0 | 3.5 | 0.0 | 0 | 660 | 13.1 |
| 41 | 70.0 | 0.0 | 16.2 | 10.3 | 0.0 | 0.0 | 3.5 | −0.1 | 2 | 660 | 12.8 |
| 42 | 64.9 | 0.0 | 15.0 | 0.0 | 20.1 | 0.0 | 0.0 | 0.0 | 1 | 610 | 12.3 |
| 43 | 0.0 | 76.5 | 12.2 | 0.0 | 7.8 | 0.0 | 3.5 | −0.1 | 3 | 650 | 12.7 |
| 44 | 0.0 | 76.5 | 12.2 | 7.8 | 0.0 | 0.0 | 3.5 | 0.0 | 1 | 640 | 12.3 |
| 45 | 0.0 | 80.6 | 10.2 | 0.0 | 9.2 | 0.0 | 0.0 | 0.0 | 1 | 620 | 12.0 |
| COMPARATIVE SPECIMEN 1 | — | — | — | — | — | — | — | −3.0 | 50 | 630 | 12.5 |

TABLE 6-continued

| SPECIMEN NO. | FILTING POWDER (wt %) | | | | | | | DIMEN- SIONAL CHANGE RATE (%) | DEFORMA- TION AMOUNT (μm) | INITIAL MAGNETIC PERME- ABILITY | MECHA- NICAL STRENGTH (kgf) |
|---|---|---|---|---|---|---|---|---|---|---|---|
| | Zn-SYSTEM FERRITE | | METAL POWDER | | METAL COMPOUND | | | | | | |
| | $ZnFe_2O_4$ | $Ni0.1Zn0.9Fe_2O_4$ | Fe | Ni | NiO | ZnO | CuO | | | | |
| COMPARATIVE SPECIMEN 2 | 0.0 | 0.0 | 56.4 | 0.0 | 12.0 | 27.5 | 4.1 | 0.0 | 20 | 650 | 12.8 |

Specimens No. 40 to 45 are the magnetic materials according to this embodiment, a comparative specimen 1 is a magnetic material with which filling powder is not mixed in this embodiment, and a comparative specimen 2 is a magnetic material obtained by mixing metal iron powder and metal oxides to have substantially the same composition as ferrite particles without mixing Zn-system ferrite, and mixing 25 weight parts of this filling powder with the ferrite particles for forming ferrite grains 1 in this embodiment.

As clearly understood from Table 6, magnetic properties and mechanical strengths were substantially the same in the specimens 40 to 45, the comparative specimen 1 and the comparative specimen 2. In the comparative specimen 1 to which filling powder was not added, dimensional contraction of 3% occurred during sintering. On the other hand, the dimensional shrinkage rates could be extremely decreased in the samples 40 to 45 and the comparative specimen 2 to which filling powder was added. Further, the samples 40 to 45 and the comparative specimen 2 were compared. In the case of the specimens 40 to 45, because filling powder included Zn-system ferrite, the optimum mixing amount of the filling powder was increased, but a deformation amount was improved and lower than that of the comparative specimen 2. It was found that mixing of Zn-system ferrite powder is effective for manufacturing a magnetic material of a high dimensional accuracy.

Initial magnetic permeabilities, dimensional change rates, tensile strengths and deformation amounts in Example 1, Example 2, Example 3 and Example 4 were calculated and measured as follows.

In order to measure the initial magnetic permeability, each sample was prepared by winding an insulation tape around the above-described annular magnetic material once, and winding an insulation copper wire having a diameter of 0.26 mm over the entire circumference of the magnetic material uniformly once. Next, a self-inductance L at 1 MHz was measured by an impedance analyzer when a measuring magnetic field strength was 0.8 (A/m) or less, and an initial magnetic permeability was calculated.

The dimensional change rate was obtained by measuring a diameter of the annular molded article before heat treatment and a diameter of the annular magnetic material after heat treatment, and calculating a rate of the diameters. A minus denotes contraction.

In order to measure the tensile strength, two thin wires were inserted in the annular magnetic material once, and after one of the wires was fixed, the other wire was drawn in the vertical direction at a speed of 5 mm/min or less. A tensile load at the moment of breakage of the magnetic material was measured. The deformation amount was obtained by measuring the maximum value and the minimum value of the diameter of the annular magnetic material after sintering, and calculating a difference between the values.

INDUSTRIAL APPLICABILITY

As described heretofore, according to the present invention, the magnetic material comprises a great number of ferrite grains which are formed by sintering ferrite raw powder, and shrinkage preventing grains which are interposed among these plural ferrite grains and which are sintered with the ferrite grains in contact with the outer peripheries thereof and are also oxidized with oxygen so as to change into ferrite when the grains are sintered.

With the above-described structure, there can be provided a magnetic material whose dimensional change rate due to sintering is low and whose magnetic property is not deteriorated.

We claim:

1. A magnetic material comprising shrinkage preventing grains which: are present between a plurality of Ni—Zn ferrite grains, are formed by sintering during which a filling powder containing at least one metal of Fe, Ni and Zn combines with a peripheral region of the respective Ni—Zn ferrite grain and also reacts with oxygen under an oxidizing reaction to change into ferrite of the shrinkage preventing grains, and have an Fe spinel crystal structure wherein the shrinkage preventing grains are finer than the Ni—Zn ferrite grains.

2. A magnetic material according to claim 1, wherein the filling powder contains 60 to 80 weight percent of Fe powder and 20 to 40 weight percent of Zn powder.

3. A magnetic material according to claim 1, wherein the filling powder contains Fe-containing powder, Ni-containing powder and Zn-containing powder, such that the metal of the filling powder contains 60 to 80 weight percent Fe, 13 to 20 weight percent Ni, and 20 to 40 weight percent Zn.

4. A magnetic material according to claim 3, wherein the filling powder consists essentially of Fe powder provided in an amount such that 60 to 80 weight percent of the metal of the filling powder is Fe, NiO powder provided in an amount such that 13 to 20 weight percent of the metal of the filling powder is Ni, ZnO powder provided in an amount such that 20 to 40 weight percent of the metal of the filling powder is Zn.

5. A magnetic material according to claim 3, wherein the filling powder consists essentially of $Fe_2O_3$ powder such that the metal of the filling powder is 60 to 80 weight percent Fe, Ni powder such that the metal of the filling powder is 13 to 20 weight percent Ni, and ZnO powder such that the metal of the filling powder is 20 to 40 weight percent Zn.

6. A magnetic material according to claim 3, wherein the filling powder consists of $Fe_2O_3$ powder such that the metal of the filling powder is 60 to 80 weight percent Fe, NiO powder such that the metal of the filling powder is 13 to 20 weight percent Ni, and Zn powder such that the metal of the filling powder is 20 to 40 weight percent Zn.

7. The magnetic material of claim 1, wherein the filling powder is made from metal iron powder, nickel oxide powder, and zinc oxide powder.

8. The magnetic material of claim 1, wherein the filling powder is made from iron oxide powder, metal nickel powder, and zinc oxide powder.

9. The magnetic material of claim 1, wherein the filling powder is made from iron oxide powder, nickel oxide powder, and metal zinc oxide.

10. The magnetic material of claim 1, wherein the shrinkage preventing grains are different from that of the Ni—Zn ferrite grains in composition.

* * * * *